3,311,536
2 - METHYL - 4 - SULFONILAMIDO - 6 - METHOXY-3(2H)-PYRIDAZINONE FOR TREATING COCCIDIOSIS
Miyoshi Ikeda and Fujio Fujioka, Tokyo, and Chutaro Sugiyama and Takenari Nakagome, Nishinomiya, Japan, assignors to Sumitomo Chemical Co., Ltd., Osaka, Japan
No Drawing. Filed Jan. 20, 1966, Ser. No. 521,805
Claims priority, application Japan, Jan. 23, 1965, 40/3,721
2 Claims. (Cl. 167—53.1)

The present invention relates to the use of 2-methyl-4-sulfanilamido - 6 - methoxy-3(2H)-pyridazinone (hereinafter referred to as "CS") in the treatment of a poultry coccidiosis.

The instant invention depends upon the fact that CS possesses an unexpectedly remarkable effect against poultry coccidiosis, whereby the disease can be cured by administering the compound per se or in the form of mixtures with suitable diluents such as poultry feed.

In order to obtain a satisfactory therapeutic effect, the compound CS is administered for 3 to 4 days at 0.1% (by weight) concentration in feed in the case of ordinary infection, and at 0.2% (by weight) concentration in the case of severe infection. Alternatively, a 0.1 to 0.4 weight percent aqueous solution of CS can be administered for about 3 to 7 days.

When the disease occurs outdoors, poultries may be considered to get resistive to the disease by repetition of slight infection. Further, the number of oocysts taken at a time may be widely varied in each case and is probably smaller than that experimentally given. Accordingly, complete prevention and treatment of the disease can be safely accomplished by consecutive or intermittent administration of a relatively low concentration of the compound CS according to its characteristics.

If administered within 4 days after infection by poultry coccidiosis, the compound may be so effective that death of the infected poultries can be completely prevented and characteristically oocysts are not found in the feces evacuated by the poultries.

Even when this compound is consecutively administered for 30 days at a concentration around 0.3%, no side action is found and no substantial difference is observed in the growth of poultries between the administered group and the control group. Thus, the compound is extremely low in toxicity and can be used safely.

The result of experimental tests on treatment of artificially infected poultries for poultry coccidiosis is set forth below.

(1) *Test chickens and method of administration*

New-born male chickens of White Leghorn were bred in a laboratory for 15 days, from which healthy chickens of nearly equal body weight were selected to experiment with in groups respectively consisting of 10. Each group of the test chickens was admitted in a wire-netting breeding box and was given three times a day paste bait prepared by mixing the drug in a commercially available formular feed containing no other coccidiostat agent and a half amount of water. The administrations of the drug begin respectively on the 1st, 2nd, 3rd and 4th day after infection and were continued until the termination of the test. In view of the characteristics of *Eimeria tenella*, each test was terminated 9 days after infection.

(2) *Infection material*

The oocysts of *Eimeria tenella* were injected into the crop of chickens uninfected with coccidiosis. 8 to 9 days after infection, the oocysts were collected from the caecum, washed well with water and allowed to stand in 2.5% potassium bichromate solution at 27 to 30° C. for 3 to 4 days. The fresh oocysts were suspended in water to make a suspension containing the desired numbers ($8 \times 10^4$ or $10 \times 10^4$) of oocysts per ml. 1 ml. of the suspension was given to each chicken by injecting directly into the crop.

(3) *Judgment of therapeutic effect*

The effect of the drug was collectively judged on the body weight gain, the evacuation of hemafecia, the activity, the status of intake of feed, the number of deaths, the view of post-mortem examination, the detection of oocysts from the caecum and feces and the side action of the drug during the test.

(4) *Effect of drug*

(a) ACTIVITY OF CHICKENS

| Method of administration | Number of oocysts infected | |
|---|---|---|
| | $8 \times 10^4$ | $10 \times 10^4$ |
| Administered from the 3rd day with 0.3% concentration. | Slightly dull for 4 to 6 days after the start of the test. | |
| Administered from the 4th day with 0.3% concentration. | Considerably dull for 4 to 7 days after the start of the test. Recovered on the 8th day. | |
| Administered everyday with 0.1% concentration. | do. | |
| Infected and no administration. | Considerably dull for 4 to 7 days after the start of the test. | Considerably dull for 4 to 7 days after the start of the test. |
| Administered everyday with 0.3% concentration. | Not different from the uninfected control group. | |
| Administered from the 2nd day with 0.3% concentration. | do. | |
| Administered everyday with 0.2% concentration. | | Not different from the uninfected control group. |
| Administered from the 2nd day with 0.2% concentration. | Not different from the uninfected control group. | Do. |
| Administered from the 3rd day with 0.2% concentration. | | Considerably dull for 4 to 7 days after the start of the test but better than the infected and non-administered group. |

(b) STATUS OF INTAKE OF FEED

| Method of administration | Number of oocysts infected | |
|---|---|---|
| | $8 \times 10^4$ | $10 \times 10^4$ |
| Administered from the 3rd day with 0.3% concentration. | Slightly weak appetite. No depression in the amount of feed taken. | |
| Administered from the 4th day with 0.3% concentration. | Weak appetite for 5 to 6 days after the start of the test. | |
| Administered everyday with 0.1% concentration. | Weak appetite for 4 to 7 days after the start of the test. No depression in the amount of feed taken. | |
| Infected and no administration | Very weak appetite from the 5th day to the final day. | Extremely weak appetite from the 4th day. The amount of feed decreased to ½ for 5 to 9 days after the infection. |
| Administered everyday with 0.3% concentration. | Slightly weak appetite. No depression in the amount of feed taken. | |
| Administered from the 2nd day with 0.3% concentration. | ____do____ | |
| Administered everyday with 0.2% concentration. | | Slightly weak appetite. No depression in the amount of feed taken. |
| Administered from the 2nd day with 0.2% concentration. | | Do. |
| Administered from the 3rd day with 0.2% concentration. | | Weak appetite for 4 to 7 days after the start of the test. No depression in the amount of feed taken. |

THE AMOUNT OF FEED TAKEN BY AVERAGE WEIGHT (G.) PER POULTRY TESTED

| | Before infection | Days after infection of oocysts | | | | | | | | | Total amount |
|---|---|---|---|---|---|---|---|---|---|---|---|
| | | 1 | 2 | 3 | 4 | 5 | 6 | 7 | 8 | 9 | |
| | Age of chicken in days | | | | | | | | | | |
| | 15 | 16 | 17 | 18 | 19 | 20 | 21 | 22 | 23 | 24 | |
| (I) When the number of oocysts infected is $8 \times 10^4$: | | | | | | | | | | | |
| 0.3%, everyday | 21.0 | 23.0 | 24.0 | 25.0 | 26.5 | 27.0 | 27.0 | 29.0 | 30.0 | 30.0 | 262.5 |
| 0.2%, everyday | 21.0 | 23.0 | 24.0 | 25.0 | 26.5 | 27.0 | 27.0 | 29.0 | 30.0 | 30.0 | 262.5 |
| 0.1%, everyday | 21.0 | 23.0 | 24.0 | 25.0 | 26.5 | 27.0 | 27.0 | 29.0 | 30.0 | 30.0 | 262.5 |
| 0.3%, from the 2nd day | 21.0 | 23.0 | 24.0 | 25.0 | 26.5 | 27.0 | 27.0 | 29.0 | 30.0 | 30.0 | 262.5 |
| 0.3%, from the 3rd day | 21.0 | 23.0 | 24.0 | 25.0 | 26.5 | 27.0 | 27.0 | 29.0 | 30.0 | 30.0 | 262.5 |
| 0.3%, from the 4th day | 21.0 | 23.0 | 24.0 | 25.0 | 26.5 | 18.0 | 18.0 | 29.0 | 30.0 | 30.0 | 244.5 |
| Infected and no administration | 21.0 | 23.0 | 24.0 | 25.0 | 25.0 | 18.0 | 9.0 | 4.0 | 4.5 | 4.5 | 158.0 |
| Control (uninfected and no administration) | 21.0 | 23.0 | 24.0 | 25.0 | 26.5 | 27.0 | 27.0 | 29.0 | 30.0 | 30.0 | 262.5 |
| (II) When the number of oocysts infected is $10 \times 10^4$: | | | | | | | | | | | |
| 0.2%, everyday | 21.0 | 23.0 | 24.0 | 25.0 | 26.5 | 27.0 | 29.0 | 30.0 | 32.0 | 33.0 | 270.5 |
| 0.2%, from the 2nd day | 21.0 | 23.0 | 24.0 | 25.0 | 26.5 | 27.0 | 29.0 | 30.0 | 32.0 | 33.0 | 270.5 |
| 0.2%, from the 3rd day | 21.0 | 23.0 | 24.0 | 25.0 | 26.5 | 27.0 | 29.0 | 30.0 | 32.0 | 33.0 | 270.5 |
| Infected and no administration | 21.0 | 23.0 | 24.0 | 25.0 | 26.5 | 9.0 | 9.0 | 8.0 | 12.0 | 12.0 | 169.5 |
| Control | 21.0 | 23.0 | 24.0 | 25.0 | 26.5 | 27.0 | 29.0 | 30.0 | 32.0 | 33.0 | 270.5 |

(c) DEATHS, HEMAFECIA, NUMBER OF OOCYSTS IN FECES AND BODY WEIGHT GAIN

Body weight: Average per chicken.

Judgment of hemafecia (bloody parts in total feces evacuated at night): $+$=1 to 10, $++$=11 to 20, $+++$=21 to 30, $++++$=31 to 40, $+++++$=more than 41.

OPG: Number of oocysts in 1 g. of feces evacuated at night.

| | Before infection | Days after infection of oocysts | | | | | | | Total number of deaths | Percent body weight gain |
|---|---|---|---|---|---|---|---|---|---|---|
| | | 2 | 4 | 5 | 6 | 7 | 8 | 9 | | |
| | Age of chicken in days | | | | | | | | | |
| | 15 | 17 | 19 | 20 | 21 | 22 | 23 | 24 | | |
| (I) When the number of oocysts infected is $8 \times 10^4$: | | | | | | | | | | |
| 0.3%, everyday: | | | | | | | | | | |
| Body weight (g.) | 102 | 117 | 126 | | 135 | | 145 | 154 | 0 | 51.0 |
| Hemafecia | | | | | | | | | | |
| OPG | | | | | | | | | | |
| Death | | | | | | | | | | |
| 0.3%, from the 2nd day: | | | | | | | | | | |
| Body weight (g.) | 102 | 118 | 129 | | 137 | | 147 | 152 | 0 | 49.2 |
| Hemafecia | | | | | | | | | | |
| OPG | | | | | | | | | | |
| Death | | | | | | | | | | |
| 0.3%, from the 3rd day: | | | | | | | | | | |
| Body weight (g.) | 102 | 114 | 129 | | 136 | | 149 | 155 | 0 | 51.8 |
| Hemafecia | | | + | + | + | | | | | |
| OPG | | | | | | | | | | |
| Death | | | | | | | | | | |
| 0.3%, from the 4th day: | | | | | | | | | | |
| Body weight (g.) | 102 | 118 | 130 | | 126 | | 139 | 144 | 2 | 41.1 |
| Hemafecia | | | +++ | +++++ | ++ | | | | | |
| OPG | | | | | 2 | | | | | |
| Death | | | | | | | | | | |

(C) DEATHS, HEMAFECIA, NUMBER OF OOCYSTS IN FECES AND BODY WEIGHT GAIN—Continued

| | Before infection | Days after infection of oocysts | | | | | | | Total number of deaths | Percent body weight gain |
|---|---|---|---|---|---|---|---|---|---|---|
| | | 2 | 4 | 5 | 6 | 7 | 8 | 9 | | |
| | Age of chicken in days | | | | | | | | | |
| | 15 | 17 | 19 | 20 | 21 | 22 | 23 | 24 | | |
| 0.2%, everyday: | | | | | | | | | | |
|   Body weight (g.) | 102 | 119 | 131 | ---- | 140 | ---- | 151 | 160 | 0 | 56.2 |
|   Hemafecia | ---- | ---- | ---- | ---- | ---- | + | ---- | ---- | | |
|   OPG | ---- | ---- | ---- | ---- | ---- | ---- | ---- | ---- | | |
|   Death | ---- | ---- | ---- | ---- | ---- | ---- | ---- | ---- | | |
| 0.1%, everyday: | | | | | | | | | | |
|   Body weight (g.) | 102 | 120 | 137 | ---- | 144 | ---- | 165 | 173 | 2 | 69.6 |
|   Hemafecia | ---- | ---- | ---- | ++ | ++ | + | ---- | ---- | | |
|   OPG | ---- | ---- | ---- | ---- | ---- | ---- | ---- | ---- | | |
|   Death | ---- | ---- | ---- | ---- | ---- | 1 | 1 | ---- | | |
| Infected and no administration: | | | | | | | | | | |
|   Body weight (g.) | 102 | 119 | 131 | ---- | 114 | ---- | 110 | 118 | 6 | 15.7 |
|   Hemafecia | ---- | ---- | +++ | +++++ | +++ | ---- | ---- | ---- | | |
|   OPG | ---- | ---- | ---- | ---- | 2,000 | 235,000 | 380,000 | 32,000 | | |
|   Death | ---- | ---- | ---- | 5 | ---- | 1 | ---- | ---- | | |
| Control (uninfected and no administration): | | | | | | | | | | |
|   Body weight (g.) | 102 | 116 | 131 | ---- | 142 | ---- | 155 | 163 | 0 | 59.8 |
|   Hemafecia | ---- | ---- | ---- | ---- | ---- | ---- | ---- | ---- | | |
|   OPG | ---- | ---- | ---- | ---- | ---- | ---- | ---- | ---- | | |
|   Death | ---- | ---- | ---- | ---- | ---- | ---- | ---- | ---- | | |
| (II) When the number of oocysts infected is $10 \times 10^4$: | | | | | | | | | | |
| 0.2%, everyday: | | | | | | | | | | |
|   Body weight (g.) | 106 | 120 | 133 | ---- | 146 | ---- | 161 | 166 | 0 | 58.5 |
|   Hemafecia | ---- | ---- | ---- | ---- | + | + | ---- | ---- | | |
|   OPG | ---- | ---- | ---- | ---- | ---- | ---- | ---- | ---- | | |
|   Death | ---- | ---- | ---- | ---- | ---- | ---- | ---- | ---- | | |
| 0.2%, from the 2nd day: | | | | | | | | | | |
|   Body weight (g.) | 106 | 123 | 135 | ---- | 151 | ---- | 166 | 170 | 0 | 60.4 |
|   Hemafecia | ---- | ---- | ---- | ---- | + | + | + | ---- | | |
|   OPG | ---- | ---- | ---- | ---- | ---- | ---- | ---- | ---- | | |
|   Death | ---- | ---- | ---- | ---- | ---- | ---- | ---- | ---- | | |
| 0.2%, from the 3rd day: | | | | | | | | | | |
|   Body weight (g.) | 106 | 120 | 133 | ---- | 140 | ---- | 155 | 157 | 0 | 48.1 |
|   Hemafecia | ---- | ---- | +++ | ++++ | ++ | ---- | ---- | ---- | | |
|   OPG | ---- | ---- | ---- | ---- | ---- | ---- | ---- | ---- | | |
|   Death | ---- | ---- | ---- | ---- | ---- | ---- | ---- | ---- | | |
| Infected and no administration: | | | | | | | | | | |
|   Body weight (g.) | 106 | 122 | 132 | ---- | 128 | ---- | 129 | 130 | 8 | 22.6 |
|   Hemafecia | ---- | ---- | ++++ | +++++ | ++++ | ++++ | ++ | ---- | | |
|   OPG | ---- | ---- | ---- | ---- | 12,200 | 27,200 | 176,000 | 196,000 | | |
|   Death | ---- | ---- | ---- | 4 | 2 | 2 | ---- | ---- | | |
| Control (uninfected and no administration): | | | | | | | | | | |
|   Body weight (g.) | 106 | 120 | 134 | ---- | 150 | ---- | 167 | 175 | 0 | 65.1 |
|   Hemafecia | ---- | ---- | ---- | ---- | ---- | ---- | ---- | ---- | | |
|   OPG | ---- | ---- | ---- | ---- | ---- | ---- | ---- | ---- | | |
|   Death | ---- | ---- | ---- | ---- | ---- | ---- | ---- | ---- | | |

(d) OOCYSTS IN CAECUM

In the caecum of all dead chickens except those infected with $10 \times 10^4$ of oocysts and dead on the 7th day, on oocyst was observed. In the caecum of the chickens dead within 7 days of the infected and not administered group, 1,920,000 or 3,200,000 of oocysts were found. On the 10th day after the start of the test, the survivals of all the groups were sacrificed and subjected to the observation of oocysts. About 110,000 of oocysts were found in the caecum of four survivals of the group infected with $8 \times 10^4$ of oocysts and not administered, and 500,000 in that of two survivals of the group infected with $10 \times 10^4$ of oocysts and not administered. Only about 1,000 oocysts were found in the caecum of 8 birds which received everyday the drug at 0.1% concentration and no oocyst was found at all in other administered groups.

(e) VIEW OF POST-MORTEM EXAMINATION OF CAECUM

The caecum of chickens dead within 5 to 6 days after infection (5 and 6 birds of the infected and not administered groups and 2 birds of the group administered with 0.3% concentration from the 4th day) assumed a dark purple colour in its entirety, showed hypertrophia and haemorrhagia and was filled with blood clot. That of other dead chickens (each 1 bird dead on the 7th and 8th days of the group administered with 0.1% concentration and 1 bird dead on the 7th day of the infected and not administered group) assumed a dark purple colour, and was swollen 2 to 3 times and filled with blood clot. That of 2 birds dead on the 7th day of the group infected with $10 \times 10^4$ oocysts and not administered was swollen and filled with grayish while solid content.

On the contrary, that of the chickens of the groups respectively administered with 0.2% concentration everyday and from the 2nd day, and with 3% concentration everyday and from the 2nd day was normal showing no difference from that of the control group. The caecum of the chickens of the groups respectively administered with 0.1% concentration everyday, 0.2% concentration from the 3rd day and 0.3% concentration from the 3rd and 4th days was slightly swollen and the grayish white to yellowish gray-white or reddish black content was present.

(5) *Test on toxicity if drug*

White Leghorn male chickens aged 15 days were respectively given the mixtures of the compound in feed at concentrations of 1%, 0.5%, 0.3% and 0.1% for 23 to 30 consecutive days. The result of the observation on the amount of feed taken and the body weight gain in the said duration is shown in the subsequent table. The general symptons and the view of post-mortem examination are as follows:

white colour and the urinary tract had a small amount of uric acid calculus.

| | Before medi-cation | Days of medication | | | | | | | | | | | | | | |
|---|---|---|---|---|---|---|---|---|---|---|---|---|---|---|---|---|
| | | 1 | 2 | 3 | 4 | 5 | 6 | 7 | 8 | 9 | 10 | 11 | 12 | 13 | 14 | 15 |
| | | Age of chicken in days | | | | | | | | | | | | | | |
| | 15 | 16 | 17 | 18 | 19 | 20 | 21 | 22 | 23 | 24 | 25 | 26 | 27 | 28 | 29 | 30 |
| Amount of feed taken (g.): | | | | | | | | | | | | | | | | |
| 1% | 20.0 | 19.0 | 18.0 | 16.0 | 18.0 | 16.5 | 10.0 | *13.0 | 16.0 | *11.0 | *20.0 | 18.0 | *24.0 | 24.0 | 19.0 | 24.0 |
| 0.5% | 20.0 | 20.0 | 20.0 | 22.0 | 20.0 | 26.5 | 25.0 | 27.0 | 28.5 | 31.0 | 25.0 | 21.0 | 24.0 | 36.0 | 24.0 | *24.0 |
| 0.3% | 20.0 | 21.0 | 21.0 | 24.0 | 25.0 | 26.5 | 27.0 | 29.0 | 30.0 | 31.0 | 35.0 | 34.0 | 36.0 | 36.0 | 36.0 | 36.0 |
| 0.1% | 20.0 | 21.0 | 21.0 | 24.0 | 25.0 | 26.5 | 27.0 | 29.0 | 30.0 | 31.0 | 35.0 | 36.0 | 36.0 | 36.0 | 36.0 | 36.0 |
| Control | 20.0 | 21.0 | 21.0 | 24.0 | 25.0 | 26.5 | 27.0 | 29.0 | 30.0 | 32.0 | 35.0 | 36.0 | 36.0 | 36.0 | 36.0 | 36.0 |
| Body weight gain (g.): | | | | | | | | | | | | | | | | |
| 1% | 86 | 90 | 89 | 87 | 86 | 87 | 85 | *84 | 88 | *84 | *89 | 97 | *101 | 103 | 103 | 110 |
| 0.5% | 86 | 90 | 96 | 92 | 112 | 109 | 124 | 118 | 136 | 139 | 145 | 152 | 156 | 163 | 169 | *166 |
| 0.3% | 86 | 90 | 100 | 105 | 112 | 122 | 131 | 140 | 151 | 165 | 164 | 188 | 182 | 200 | 210 | 224 |
| 0.1% | 86 | 90 | 100 | 106 | 114 | 123 | 134 | 142 | 152 | 165 | 168 | 187 | 197 | 209 | 221 | 239 |
| Control | 86 | 90 | 99 | 106 | 113 | 122 | 132 | 139 | 150 | 160 | 175 | 184 | 195 | 209 | 220 | 234 |

| | Days of medication | | | | | | | | | | | | | | | Total amount |
|---|---|---|---|---|---|---|---|---|---|---|---|---|---|---|---|---|
| | 16 | 17 | 18 | 19 | 20 | 21 | 22 | 23 | 24 | 25 | 26 | 27 | 28 | 29 | 30 | |
| | Age of chicken in days | | | | | | | | | | | | | | | |
| | 31 | 32 | 33 | 34 | 35 | 36 | 37 | 38 | 39 | 40 | 41 | 42 | 43 | 44 | 45 | |
| Amount of feed taken (g.): | | | | | | | | | | | | | | | | |
| 1% | 25.0 | 26.0 | 29.0 | 33.0 | 19.0 | 28.0 | 26.0 | *26.0 | (43.0) | *(45.0) | (45.0) | (49.0) | (51.0) | (51.0) | (52.0) | 498.5 |
| 0.5% | 25.0 | *29.0 | 39.0 | 39.0 | 29.0 | 34.0 | 26.0 | 39.0 | 39.0 | 45.0 | 43.0 | 32.0 | 46.0 | 50.0 | 48.0 | 654.0 |
| 0.3% | 38.0 | 39.0 | 39.0 | 39.0 | 39.0 | 39.0 | 39.0 | 39.0 | 39.0 | 43.0 | 45.0 | 45.0 | 49.0 | 51.0 | 52.0 | 778.5 |
| 0.1% | 38.0 | 39.0 | 39.0 | 39.0 | 39.0 | 39.0 | 39.0 | 39.0 | 43.0 | 45.0 | 45.0 | 49.0 | 51.0 | 51.0 | 52.0 | 780.5 |
| Control | 38.0 | 39.0 | 39.0 | 39.0 | 39.0 | 39.0 | 39.0 | 39.0 | 43.0 | 45.0 | 45.0 | 49.0 | 51.0 | 51.0 | 52.0 | 781.5 |
| | | | | | | | | | | | | | | | | Percent body weight gain |
| Body weight gain (g.): | | | | | | | | | | | | | | | | |
| 1% | 118 | 122 | 125 | 133 | 133 | 140 | 142 | *148 | (158) | *(162) | (171) | (183) | (195) | (210) | (218) | 72.9 |
| 0.5% | 190 | *190 | 214 | 214 | 223 | 241 | 246 | 260 | 273 | 285 | 294 | 298 | 310 | 335 | 343 | 202.3 |
| 0.3% | 232 | 240 | 250 | 261 | 270 | 282 | 296 | 306 | 315 | 334 | 343 | 356 | 368 | 386 | 401 | 255.8 |
| 0.1% | 243 | 252 | 260 | 267 | 283 | 296 | 300 | 314 | 321 | 337 | 347 | 360 | 375 | 391 | 397 | 265.1 |
| Control | 240 | 252 | 263 | 276 | 287 | 297 | 306 | 321 | 327 | 343 | 349 | 357 | 374 | 386 | 396 | 274.4 |

NOTES.—(1) The amount of feed taken and the body weight gain are shown by the average per test chicken (g.).
(2) The number in parentheses represents the amount of feed taken or the body weight after the interruption of the medication.
(3) The total amount and the percent body weight gain show the values up to the 23rd day after the administration.
(4) Asterisk (*) represents death of test chickens.

(a) ACTIVITY OF CHICKENS

The group which received the feed mixed with the drug at 1% concentration gradually became melancholic, hanged down the wings and behaved very inactively from the 3rd or 4th day after the medication. The administration in this group was interrupted on the 23rd day and, after the interruption, the inclination of recovery in activity was observed.

The group which received the feed mixed with the drug at 0.5% concentration gradually became dull in activity from the 12th or 13th day after the administration and fell into melancholy.

Other administered groups showed almost no difference from the control group.

(b) VIEW OF POST-MORTEM EXAMINATION

All dead chickens were complicated with fibrinous pericarditis, fibrinous pleurisy and lobar pneumonia. The kidney suffered from uratosis and assumed a grayish white colour. The urinary tract was choked with uric acid calculus to cause paracrisis of urine.

In 4 surviving birds of the group administered with the drug at 1% concentration, the liver was somewhat enlarged, the kidney fell in uratosis to assume a grayish 1. A method for preventing and treating poultry coc- generally employed concentration, for instance, lower than 0.3%, and can be used very safely.

An illustrative poultry feed composition useful for carrying out the present invention is, for instance, as follows:

| Ingredient: | Percent by weight |
|---|---|
| Barley | 18.5 |
| Wheat | 30 |
| Rice | 15 |
| Bran | 10 |
| Peanut meal | 4 |
| Soybean meal | 5 |
| Alfalfa meal | 7 |
| Whey powder | 3 |
| Yeast | 2 |
| Lime | 2 |
| Bone meal | 1.3 |
| Mineral salts, trace elements vitamins, antibiotics | 2 |
| CS | 0.2 |

As aforeindicated, any conventional feed for poultry can be used as "carrier" for the CS of this invention. It is preferred to use any of the standard feed compositions recommended by the American Nutrition Research Council.

The composition is administered as hereinbefore indicated.

Other administered groups showed no difference from the control group with no abnormality.

As illustrated above, the drug shows no toxicity at a cidiosis, which comprises orally administering to poultry a therapeutically effective amount of 2-methyl-4-sulfanilamido-6-methoxy-3(2H)-pyridazinone.

What is claimed is:

2. A method according to claim 1, wherein the compound is administered for 3 to 4 days at 0.1% to 0.2% (by weight) concentration in feed.

References Cited by the Examiner

J. Chem. Soc. (London), 1948, page 2195.

SAM ROSEN, *Primary Examiner.*

R. BARRESE, *Assistant Examiner.*